United States Patent [19]

Sample, Jr.

[11] 4,337,160
[45] Jun. 29, 1982

[54] ACID SOLUBLE WEIGHTING AGENT FOR WELL DRILLING, WORKOVER AND COMPLETION FLUIDS

[75] Inventor: Thomas E. Sample, Jr., Houston, Tex.

[73] Assignee: Dresser Industries, Inc., Dallas, Tex.

[21] Appl. No.: 153,105

[22] Filed: May 23, 1980

Related U.S. Application Data

[63] Continuation-in-part of Ser. No. 543,593, Jan. 23, 1975, abandoned.

[51] Int. Cl.$^3$ ............................ C09K 7/04; C09K 7/06
[52] U.S. Cl. ............................ 252/8.5 B; 252/8.5 M; 252/8.5 P; 252/8.55 R
[58] Field of Search ............ 252/8.5 B, 8.5 A, 8.5 M, 252/8.5 P, 8.55 R

[56] References Cited

U.S. PATENT DOCUMENTS 2,393,166  1/1946  Hoeppel ............................ 252/8.5
2,471,446  5/1949  Norman ............................ 252/8.5
3,622,513  11/1971  Miller ............................ 252/8.5
3,891,565  6/1975  Colpoys ............................ 252/8.5

OTHER PUBLICATIONS

Kirk–Othmer, *Encyclopedia of Chemical Technology*, Second. Rev. Ed., vol. 12, 1967, p. 38.
*Handbook of Chemistry and Physics*, 42 Edition, 1960, pp. 586–589.

*Primary Examiner*—Herbert B. Guynn
*Attorney, Agent, or Firm*—Peggy L. Smith

[57] ABSTRACT

A new weighting material for use in controlling the specific gravity of fluids employed in the drilling, completion, perforation and workover of oil and gas wells is disclosed. The material siderite ($FeCO_3$), has the unique property of being removable from the bottom of well boreholes and producing formation zones by virtue of almost complete solubility in both mineral and organic acids. This weighting material is compatible in both oil and water muds and has a density of 3.8 g/cc which allows formulation of fluid weights up to 19 lbs./gal.

3 Claims, No Drawings

ACID SOLUBLE WEIGHTING AGENT FOR WELL DRILLING, WORKOVER AND COMPLETION FLUIDS

RELATED APPLICATIONS

This application is a continuation in part of U.S. Ser. No. 543,593 filed Jan. 23, 1975, now abandoned.

Drilling, completion, perforating, and workover fluids should be nondamaging to the formation. They should also provide fluid loss control and, in some instances, should be viscous enough to transport sand and cuttings out of the well.

Often, the productivity of a formation is damaged by the invasion of undesirable mud solids. This is especially true when higher weighted muds using barite are employed, since these fluids contain a high percentage of insoluble solids. The resulting loss of production has been attributed to four primary causes; particle invasion of the fluid phase into the production zone; and, invasion of whole mud into the production zone.

Particle invasion into the production zone can block pore holes, causing a loss of either injection or return permeability, or both. Filter cake buildup on the well bore also can lead to injection permeability loss. This in turn reduces penetration of acidizing fluids that are designed to stimulate production.

Fluid phase invasion leads to swelling of clays in the formation or to water blockage caused by differences between the interfacial tension of the formation fluid and the invading fluid.

Invasion of whole mud along fracture planes of a producing formation can also cause irreversible damage deep within the formation; thus a combination of particle invasion, filter cake buildup and fluid phase damage occur within the formation.

It has been shown previously that mud particle invasion can penetrate to appreciable depths in the porous zone, causing substantial reduction in permeability. Insoluble weighting materials may also allow deposition of a damaging filter cake in the well bore. The combined effects of the insoluble filter cake and invading particles can reduce the effectiveness of well stimulation techniques.

The development of improved fluids has concentrated on solids-free and calcium-carbonate based formulations. One of the major problems of these systems is their upper weight limitation. Those system employing calcium carbonate as a weighting material are used for workover and completion because of their acid solubility. With these fluids, both the filter cake and the particles that have invaded the porous formation can be dissolved, thus allowing maximum penetration into the formation. However, because of the relatively low density of calcium carbonate (2.7 g/cc), fluids made with this material are limited in weight to about 14 pounds per gallon.

Combinations of barite and calcium carbonate have been used to obtain higher mud weights, but these combinations contain a significant amount of acid insoluble particles.

Accordingly, it is an object of the present invention to provide a weighting material having high acid solubility, compatibility with both oil and water muds, and density enabling formulation of fluids weighted to the 19 pounds per gallon range.

In accordance with the present invention, there is provided a water or oil base drilling, workover and completion fluid having a weighting material comprising $FeCO_3$ in amount sufficient to provide a fluid density up to 19 pounds per gallon.

Iron carbonate ($FeCO_3$) occurs in nature as the mineral siderite. Pure iron carbonate has a density of 3.83 to 3.88 g/cc, and has a hardness of 3.5 to 4. It can be ground to essentially the same particle size as barite, thus making it easy to suspend in a drilling fluid. Iron carbonate has high acid solubility. It is more soluble at room temperature than other forms of iron such as hematite ($Fe_2O_3$) although the other forms of iron are soluble in hot hydrochloric acid, they dissolve more slowly than iron carbonate. In addition, iron carbonate is much more soluble in formic acid, which is frequently used in well stimulation where conditions prohibit the use of hydrochloric acid.

The iron in the iron carbonate is in the iron (II) or ferrous oxidation state. This is an advantage over compounds containing iron in the ferric state, such as $Fe_2O_3$. Since the reduction of iron (III) to iron (II) in acidic media occurs readily in the presence of unprotected iron pipe or other metallic iron, severe corrosion of drill pipe and casing can result.

Dissolved iron will remain in solution until the acid is spent and the pH rises. At some point, precipitation of iron hydroxide can occur. Previous work shows that this can seriously damage flow channels opened by acidization. However, the pH values at which ferric iron and ferrous iron precipitate differ significantly. Ferric hydroxide precipitates in the pH range of 2 to 3, while ferrous hydroxide precipitates in the range of 7 to 9. Previous work has shown that the pH of spent acid in wells seldom reaches a value of 6 before dissolved iron is produced at the surface. Accordingly, the dissolved iron from iron carbonate should not precipitate under these conditions.

An argillaceous or clay-type siderite which would consist of clay, siderite, and iron oxides has been suggested for this use, but would not have the same characteristics of the material of this invention.

Acid solubilities were determined gravimetrically using Gelman Versapor, 5 micron glass-epoxy elements. Approximately one gram of iron carbonate was dried 16 hours at 100° C., cooled to room temperature, and weighted into a 50 milliliter flask. 20 ml of 15% HCl were added, and the sample was agitated by a magnetic stirring bar at 25° C. for the specified time. The sample was then rapidly vacuum filtered. The residue was thoroughly washed with deionized water, dried 4 hours at 100° C., cooled in a vacuum desiccator, and weighed. The filter elements had previously been dried 4 hours at 110° C., marked and weighed and stored in a vacuum desiccator.

The procedure for the formic acid solubility tests was the same except that 40 ml of 15% formic acid were added to approximately 1 gram of iron carbonate and the sample was immediately brought to reflux (105° C.) and held there for a specified time.

The small sample size, 1 gram, was chosen so the liquid volume could be filtered rapidly. This kept filtering time short enough to avoid significant effects on the results. In the formic acid test, this also minimized the heat-up time required. While the effects of filter time and heat-up time would not be significant in longer exposure time intervals, they could become a significant portion of the short exposure times employed in these procedures.

The acid solubility test results show that iron carbonate dissolves very rapidly and almost completely in 15% hydrochloric acid at an ambient temperature. It dissolves somewhat slower in formic acid, but still exhibits solubility for an acid soluble weighting material. The results are shown in Table I below.

TABLE I

| % Solubility-HCL | Time (Min.) | % Solubility-HCOOH |
|---|---|---|
| 42.5 | 5 |  |
| 70.3 | 10 | 22.5 |
| 79.4 | 15 |  |
| 86.8 | 20 | 29.7 |
| 88.9 | 25 |  |
| 90.4 | 30 |  |
|  | 50 | 48.7 |
|  | 120 | 81.5 |

Although the use of $Fe_2O_3$ as a weighting agent in drilling fluid has been suggested in U.S. Pat. No. 3,622,513 to Miller, it has been found that $FeCO_3$ has a markedly higher rate of solubility in acid than does $Fe_2O_3$, particularly in the range of temperature normally encountered in oil wells, i.e up to about 250° F. Further, it appears that the unique solubility characteristics of $FeCO_3$ are due not only to the oxidation state, but also to the nature of the anion since, as shown below, $FeCO_3$ dissolves in HCl at a faster rate than does $Fe_3O_4$. Samples were stirred continuously in 500 ml of acid and while stirring approximately 15 ml samples were removed at indicated time intervals, and centrifuged at high speed for 5 minutes effluents were decanted immediately. Sample weights were such that there was a 50% excess of acid over that required to completely dissolve the sample, assuming 100% purity. Iron contents of effluents were determined by atomic absorption. Data is reported as % sample dissolved, assuming all of the iron in siderite is $FeCO_3$, all of the iron in hematite is $Fe_2O_3$, and all of the iron in magnetite is $Fe_3O_4$.

The following Table II shows the sample weight used with that acid concentration:

TABLE II

|  | HCl | | | Formic Acid | | |
|---|---|---|---|---|---|---|
|  | 1% | 5% | 10% | 1% | 5% | 10% |
| Siderite - gms | 5.31 | 27.1 | 55.5 | 4.22 | 21.2 | 42.9 |
| Hematite - gms | 2.44 | 12.5 | 25.4 | 1.94 | 9.8 | 19.7 |
| Magnetite - gms | 2.65 | 13.5 | 27.7 | 2.11 | 10.6 | 21.4 |

Analysis of Samples Dissolved in Conc. HCl
Siderite: 44.9% Fe equiv. to 93.1% $FeCO_3$
Hematite: 60.7% Fe equiv. to 86.8% $Fe_2O_3$
Magnetite: 62.5% Fe equiv. to 86.4% $Fe_3O_4$ Tables III and IV below show the dramatic difference in solubility rates in both HCl and formic acid for Ferrous Carbonate as compared with both Hematite and Magnetite.

TABLE III

| % SAMPLE DISSOLVED | | | | | | |
|---|---|---|---|---|---|---|
|  | FERROUS CARBONATE | | HEMATITE | | MAGNETITE | |
|  | Room Temp | 150° F. | Room Temp | 150° F. | Room Temp | 150° F. |
| 1% HCl |  |  |  |  |  |  |
| 5 Min. | 0.8 | 38.1 | 0.041 | 0.09 | 0.09 | 0.65 |
| 15 Min. | 2.5 | 59.5 | 0.051 | 0.11 | 0.15 | 1.30 |
| 30 Min. | 5.5 | 71.2 | 0.059 | 0.14 | 0.22 | 2.09 |
| 45 Min. | 8.8 | 77.1 | 0.064 | 0.17 | 0.27 | 3.05 |
| 60 Min. | 12.3 | 84.9 | 0.067 | 0.19 | 0.33 | 4.16 |
| 5% HCl |  |  |  |  |  |  |
| 5 Min. | 5.3 | 77.8 | 0.057 | 0.18 | 0.24 | 6.1 |
| 15 Min. | 14.3 | 81.4 | 0.071 | 0.30 | 0.43 | 16.1 |
| 30 Min. | 21.1 | 86.2 | 0.086 | 0.49 | 0.64 | 28.9 |
| 45 Min. | 31.6 | 88.6 | 0.092 | 0.69 | 0.87 | 38.3 |
| 60 Min. | 38.3 | 90.9 | 0.109 | 0.90 | 1.07 | 46.0 |
| 10% HCl |  |  |  |  |  |  |
| 5 Min. | 22.2 | 82.9 | 0.073 | 0.42 | 0.62 | 32.5 |
| 15 Min. | 39.7 | 84.1 | 0.087 | 0.96 | 1.22 | 48.7 |
| 30 Min. | 50.5 | 86.4 | 0.101 | 1.66 | 2.17 | 57.5 |
| 45 Min. | 63.5 | 88.8 | 0.118 | 2.42 | 3.12 | 65.0 |
| 60 Min. | 68.7 | 91.1 | 0.131 | 3.15 | 4.26 | 70.0 |

TABLE IV

| % SAMPLE DISSOLVED | | | | | | |
|---|---|---|---|---|---|---|
|  | FERROUS CARBONATE | | HEMATITE | | MAGNETITE | |
|  | Room Temp | 150° F. | Room Temp | 150° F. | Room Temp | 150° F. |
| 1% Formic Acid |  |  |  |  |  |  |
| 5 Min. | 0.20 | 4.60 | 0.033 | 0.053 | 0.061 | 0.087 |
| 15 Min. | 0.42 | 9.58 | 0.037 | 0.057 | 0.062 | 0.131 |
| 30 Min. | 0.77 | 15.00 | 0.044 | 0.063 | 0.082 | 0.164 |
| 45 Min. | 1.11 | 19.91 | 0.044 | 0.066 | 0.117 | 0.203 |
| 60 Min. | 1.47 | 23.95 | 0.051 | 0.074 | 0.131 | 0.243 |
| 5% Formic Acid |  |  |  |  |  |  |
| 5 Min. | 0.22 | 6.16 | 0.047 | 0.070 | 0.054 | 0.177 |
| 15 Min. | 0.56 | 10.76 | 0.053 | 0.079 | 0.086 | 0.314 |
| 30 Min. | 1.00 | 15.91 | 0.056 | 0.087 | 0.115 | 0.434 |
| 45 Min. | 1.44 | 19.08 | 0.059 | 0.094 | 0.130 | 0.535 |
| 60 Min. | 1.86 | 22.75 | 0.060 | 0.100 | 0.166 | 0.164 |
| 10% Formic Acid |  |  |  |  |  |  |
| 5 Min. | 0.37 | 6.04 | 0.034 | 0.069 | 0.065 | 0.322 |
| 15 Min. | 0.84 | 11.12 | 0.049 | 0.083 | 0.106 | 0.524 |
| 30 Min. | 1.35 | 16.45 | 0.053 | 0.094 | 0.151 | 0.709 |
| 45 Min. | 1.96 | 20.80 | 0.056 | 0.106 | 0.189 | 0.846 |
| 60 Min. | 2.49 | 23.93 | 0.059 | 0.113 | 0.224 | 0.963 |

To determine compatibility with both oil and water based muds, 2 gallon batches of laboratory muds were prepared using iron carbonate that had been processed commercially. The oil mud was stabilized in a mud circulating system for 16 hours at 290° F., and its rheological properties were taken at 150° F. The water based mud was stabilized for 40 hours at 300° F., and its rheological properties taken at 75° F. The results are shown in Table V below.

TABLE V

|  | OIL | WATER |
|---|---|---|
| Weight (lb/gal) | 17.6 | 18.0 |
| Apparent Viscosity (cps) | 53.5 | 81 |
| Plastic Viscosity (cps) | 51 | 80 |
| Yield Point (lb/100 sq ft) | 5 | 2 |
| Initial Gel (lb/100 sq ft) | 3 | 2 |
| Ten Minute Gel (lb/100 sq ft) | 11 | 2 |

The drilling fluids to which the weighting agents of this invention can be included may contain an effective viscosifying amount of conventional clays. Generally, from about 1 to about 20 weight percent clay can be employed, but this will vary widely depending upon the functional desires for the final drilling fluid and the clays employed. Suitable clays include kaolin, bentonite, hydrous micas, attapulgite, sepiolite and the like. Asbestos may also be used for this purpose.

Other conventional additives such as emulsifiers, fermentation control agents, and the like can be employed if desired and so long as they do not adversely affect the other materials in the composition.

The liquid medium for the drilling fluids can be aqueous, organic, or a combination thereof. Aqueous fluids include fresh water and saline water which includes both brackish and sea water (sodium chloride content greater than 1 weight percent and/or calcium content greater than 120 parts per million).

The organic base drilling fluids employ oil or other similar hydrocarbonaceous material and are termed in the petroleum industry "oil-based" drilling fluids and "invert" drilling fluids.

The "oil-based" drilling fluids are those which contain in large amounts; i.e., at least 95 weight percent, of an organic material. The organic material is normally present in the form of emulsion with the external phase being the organic material and the remainder or internal phase being a minor amount of an aqueous liquid. Thus, "oil-based" drilling fluids can be water-in-oil emulsions. Those drilling fluids which are normally termed "invert" are species of the water-in-oil emulsions which employ organic materials similar to those of the "oil-base" drilling fluids but which contain smaller amounts of the organic, external phase and large amounts of the aqueous, internal phase.

The organic base employed in these drilling fluids, be they "oil-base" or "invert" is substantially a hydrocarbon material, nonexclusive examples being crude oil, diesel oil, heavy petroleum refinery liquid residues, asphalt in its normal state, asphalt which has been oxidized by bubbling air therethrough to increase the softening point thereof, lamp black, and the like.

The weighting agent of this invention can be incorporated in the drilling fluids by simple mixing under ambient conditions of temperature and pressure for periods sufficient to give a substantially homogeneous mixture. The amount of weighting agent will vary widely depending upon the composition of the fluid itself, the amount of weighting desired, the particular conditions in the particular well to which the drilling fluid is to be added, and on and on.

Permeability studies were conducted using a Hassler core holder with regulated differential pressure and 3 tanks for brine, acid and test solutions. Flow rates were determined at a constant differential pressure. Two types of cores for use in obtaining data, Berea sandstone cores (1½ inch by 2 inch with permeabilities of 55 to 300 millidarcys) and ceramic cores (1½ inch by 2½ inch with permeabilites of 2200 to 2400 millidarcys). The cores were extracted with hot toluene and dried overnight at 100° C. After drying, cooling, and weighing the cores were soaked under vacuum in brine.

The core being tested was placed in the core holder and the annulus pressurized to 1800 to 2100 psig. Both injection and return permeabilities to brine were obtained using a differential pressure of 100 psig for the Berea sandstone cores and 20 psig for the ceramic cores. A minimum back pressure of 100 psig was maintained to eliminate gas effect; i.e., liberated $CO_2$.

The core was then subjected to a forward flow of tests and solution for 60 minutes at a differential pressure 100 psig. This caused formation of a filter cake on the face of the core.

The core was acidized by first washing 100 ml of acid over the face of the core for 60 minutes. The 150 ml of acid was injected through the core over a 30 minute period. Injection and return permeabilities were determined with a brine solution containing 5% NaCl+1% $CaCl_2$ by weight. The following results were measured.

| Iron Carbonate Fluid in Berea Core | Initial |
|---|---|
| Reverse Flow Permeability | 215 md |
| Forward Flow Permeability | 279 md |

After damage by exposure to the fluid, acid workover over the face of the core and acid injection were performed. Again, injection and return permeabilities were determined by brine flow testing.

| | Final |
|---|---|
| Reverse Flow Permeability | 300 md |
| Forward Flow Permeability | 231 md |

Slight damage to forward injection permeability was observed. Because the Berea core matrix is itself acid soluble, some permeability regain was attributed to etching of the core.

Similar permeability testing of barite ($BaSO_4$) weighted fluids were performed. Initial return permeability and injection permeability were determined by reverse and forward flow brine testing.

The following results were measured.

| Brine Fluid in Berea Core | Initial |
|---|---|
| Reverse Flow Permeability | 226 md |
| Forward Flow Permeability | 298 md |
| Reverse Flow Permeability | 328 md |
| Forward Flow Permeability | 91 md |

In the tests conducted iron carbonate weighted fluids did not cause permanent damage either by particulate invasion or by filter cake buildup.

A number of batches of oil base muds were formulated to determine the quantities of iron carbonate necessary to provide a given mud density. These formulations are shown in Table VI below.

TABLE VI

| #/GAL Mud Wt | BBL $H_2O$ | BBL Diesel Oil | #/BBL Oilfaze[1] | #/BBL Calcium Carbonate | #/BBL Iron Carbonate | #/BBL SE-12[2] | #/BBL DV-33[3] |
|---|---|---|---|---|---|---|---|
| 11.20 | 0.069 | 0.634 | 31.71 | 201.82 | 23.2 | 2.0 | 1.0 |
| 12.00 | 0.067 | 0.624 | 31.06 | 141.15 | 121.27 | 2.5 | 1.0 |
| 13.00 | 0.066 | 0.610 | 30.30 | 67.94 | 241.29 | 3.0 | 1.0 |
| 14.00 | 0.066 | 0.593 | 29.64 | | 356.58 | 3.5 | 1.0 |
| 15.00 | 0.062 | 0.555 | 27.75 | | 411.97 | 4.0 | 2.0 |
| 16.00 | 0.058 | 0.519 | 25.96 | | 466.32 | 5.0 | 2.0 |
| 17.00 | 0.053 | 0.480 | 24.02 | | 521.18 | 6.0 | 3.0 |

TABLE VI-continued

| #/GAL Mud Wt | BBL H₂O | BBL Diesel Oil | #/BBL Oilfaze[1] | #/BBL Calcium Carbonate | #/BBL Iron Carbonate | #/BBL SE-12[2] | #/BBL DV-33[3] |
| --- | --- | --- | --- | --- | --- | --- | --- |
| 18.00 | 0.049 | 0.443 | 22.17 | | 576.05 | 7.0 | 3.5 |
| 19.00 | 0.045 | 0.405 | 20.29 | | 630.90 | 8.0 | 4.0 |

[1]Oilfaze - A formulated emulsifier containing a crosslinked Mg soap as described in U.S. Pat. No. 3,784,579 with viscosifiers and a fluid loss control agent.
[2]SE-12 - A blend of phosphate ester and calcium dodecylbenzenesulfonate.
[3]DV-33 - Calcium dodecylbenzenesulfonate.

In other tests, water based muds were prepared using 1 to 1.5 pounds per barrel of hydroxyethylcelluose, 0.5 pounds per barrel duovis, 1.5 pounds per barrel MgO and 3 salt environments: saturated sodium chloride, 5 to 8% potassium chloride and 9% sodium chloride plus 1% calcium chloride. Sufficient iron carbonate was added to provide fluid densities of 16 pounds per gallon. The saturated sodium chloride system at a 1 pound per barrel HEC level showed no solids or water separation after heat aging 64 hours at 200° F. Fluid loss was controlled between 10 to 14 cc, gels went from 19/27 to 15/47, and the system was easily restirred to a pumpable 95 cp AV. A similar system containing 5% potassium chloride showed no solid separation and a very small water separation after heat aging 64 hours at 200° F. Fluid loss was controlled between 13 to 15 cc, gels went from 24/34 to 18/63, and the system was easily restirred to a pumpable 120 cp AV.

Four field brines from Oklahoma varying in density from 1.020 to 1.075 and having about 3% to 11% salt content were evaluated. The waters were treated with 3 pounds per barrel sodium carbonate, 1 pound per barrel hydroxyethylcellulose, 0.5 pounds per barrel duovis, and 2 pounds per barrel MgO. They were brought to saturation with 72.6 pounds per barrel sodium chloride and increased in density to 16 pounds per gallon with 370 pounds per barrel iron carbonate. These systems were heat aged at 200° F. for 17 hours. Except for about 5% water separation after aging, these brined produced effective high density soluble workover and completion fluids.

In other tests it was found that a 16 pound per gallon iron carbonate mud could be formulated with 1 pound per barrel hydroxyethylcellulose and 0.5 pounds per barrel XC as viscosifiers and fluid loss agents. As ionic environments, saturated sodium chloride, 9% sodium chloride plus 1% calcium chloride, and 5% potassium chloride were found to work favorably with this basic system. These systems were found to have no settling of the weight material and very little water separation after heat aging at 200° F. for 16 hours. These systems after heat aging were easily restirred to a pumpable viscosity. MgO was used to control the pH between 9 and 10.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are described as follows:

1. A well fluid comprising a liquid hydrocarbon or aqueous medium, and a weighting agent dispersed in the liquid hydrocarbon or aqueous medium consisting essentially of ferrous carbonate.

2. A well fluid according to claim 1 wherein said weighting agent is present in an amount sufficient to provide a fluid density up to 19 pounds per gallon.

3. A well fluid weighting agent comprising a mixture of ferrous carbonate and calcium carbonate, in the relative proportions of about 3.6 parts by weight of ferrous carbonate to 1 part of weight of calcium carbonate to about 8.7 parts of by weight of calcium carbonate to 1 part by weight of ferrous carbonate.

* * * * *